United States Patent [19]
Sargent

[11] Patent Number: 4,983,430
[45] Date of Patent: Jan. 8, 1991

[54] FIBER REINFORCED COMPOSITE PRODUCT HAVING A HOLLOW INTERIOR

[76] Inventor: Leigh R. Sargent, 4345 Applecross Dr., Indianapolis, Ind. 46254

[21] Appl. No.: 326,303

[22] Filed: Mar. 21, 1989

[51] Int. Cl.$^5$ .................. B60B 5/02; B29C 43/20
[52] U.S. Cl. .................. 428/34.1; 301/63 PW; 264/258; 264/315; 428/284
[58] Field of Search .................. 301/63 PW, 95, 98; 264/258, 314, 315; 428/35, 224, 225, 236, 246, 284, 290, 34.1

[56] References Cited

U.S. PATENT DOCUMENTS

| | | | |
|---|---|---|---|
| 4,030,754 | 6/1977 | Merlette | 301/63 PW |
| 4,314,964 | 2/1982 | Ferrary | 301/63 PW |
| 4,483,729 | 11/1984 | Fujisaki | 301/63 PW |
| 4,514,013 | 4/1985 | Woelfel | 301/63 PW |
| 4,532,097 | 7/1985 | Daniels | 301/63 PW |
| 4,741,578 | 5/1988 | Viellard | 301/63 PW |
| 4,793,659 | 12/1988 | Oleff | 301/95 |
| 4,828,781 | 5/1989 | Duplessis | 264/314 |

FOREIGN PATENT DOCUMENTS

2051701 1/1981 United Kingdom .................. 301/98

OTHER PUBLICATIONS

"Braids and Knits: Reinforcement in Multidirections", *Advanced Composites*, Sep./Oct. 1987, pp. 36-37, 39, 42, 44, 46, 48.

"Pushing the Limits in Sports", *Advanced Composites*, Nov./Dec., 1988, pp. 36-38, 40, 42 and 44.

*Primary Examiner*—Jay H. Woo
*Assistant Examiner*—Jeremiah F. Durkin, II
*Attorney, Agent, or Firm*—Woodard, Emhardt, Naughton Moriarty & McNett

[57] ABSTRACT

A hollow, fiber reinforced composite product having a substantially continuous outer surface and a minimum of discontinuities in the fiber reinforcement material and method for manufacturing the product. The product is manufactured by inserting a tubular bladder inside a length of composite material in tubular form so that the bladder ends extend out the corresponding ends of the composite material. An opening is formed in the side of the composite material at a location spaced apart from one of the ends thereof. Both ends of the bladder are passed through the side opening from the inside thereof. A hollow preform is formed by overlapping the ends of the composite material so that the ends of the fiber reinforcement in the composite material overlap. One of the ends of said bladder is sealed and the preform is placed into a mold. The preform is molded into the desired hollow continuous annular shape by curing the preform within said mold while inflating the bladder through its nonsealed end.

16 Claims, 2 Drawing Sheets

FIBER REINFORCED COMPOSITE PRODUCT HAVING A HOLLOW INTERIOR

BACKGROUND OF THE INVENTION

The present invention relates generally to the field of fiber reinforced composites and, more particularly, to an apparatus and method for manufacturing fiber reinforced composite products having a substantially closed, hollow interior, such as wheel rims, from such materials.

A composite material is a combination of two materials which has its own distinctive structural properties. One well known type of composite, fiber glass reinforced plastic (FRP), is formed using filaments or woven cloth of fiber glass embedded in a polyester or epoxy resin base. Fiber glass reinforced plastic composites may lack the stiffness of other polymer fiber filaments such as KEVLAR®, SPECTRA®, carbon, ceramic and boron to name a few. Composites made from such relatively high strength reinforcing polymeric fibers are generally known within the industry as advanced composites.

The use of advanced composites has in the past been restricted to relatively high technology military and aerospace applications. More recently, however, advanced composites have begun to be used outside these areas and their use is now expanding widely in areas such as the automotive and sports industries.

One example of the use of advanced composites in the sports industry is in bicycle racing. Like cars and airplanes, the main factor inhibiting speed for a bicycle is wind resistance. Wind resistance accounts for up to 90 per cent of the total force slowing down a cylist. Especially in racing situations, it is important to reduce wind resistance to the cyclist as much as possible. Because advanced composites have relatively high strength to weight ratios as compared to previously used metals such as steel and aluminum, manufacturers of racing bikes are using advanced composites wherever possible. For instance, the bike frames used by the U.S. team in the 1988 Olympics are made of advanced composite tubes weighing 3.3 lb. Each tube is shaped like an airfoil to reduce drag, while being stiffer and lighter than steel.

Some hollow structural members, such as a bicycle frame, require the presence of openings. In a bicycle frame openings are required in the frame for the handlebar, seat and pedal assemblies. Since openings are needed anyway, it is a relatively easy task to insert air into the tube openings to form the hollow frame using conventional advanced composites molding techniques.

However, other products have shapes which do not lend themselves well to forming by such techniques. In the case of a bicycle wheel rim, the overall strength of the rim is only as great as that which exists at its weakest point. Therefore it is desirable that a wheel rim not exhibit any structural weak points. Thus, while making the interior hollow to save weight and material is desirable for a composite rim, openings to the hollow interior are not desired, especially when such openings would create discontinuities in the fiber reinforcement. Previous conventionally known methods for hollow forming such composite wheel rims (as well as other products having shapes which provide similar problems) require a discontinuity or joint in the fiber reinforcement which significantly weakens the overall structural strength of the product.

SUMMARY OF THE INVENTION

The present invention provides a hollow fiber reinforced composite product having a substantially continuous outer surface and which exhibits minimal discontinuities in the fiber reinforcement material. The present invention also includes a method for making the product. According to one embodiment, there is provided composite material in a generally tubular shaped form and a generally tubular shaped bladder. The bladder is inserted inside the composite material so that the ends of the bladder extend outside the respective ends of the composite material. An opening is formed in the side of the composite material at a location spaced apart from one of the ends thereof. A first end of the bladder corresponding to the one end of the composite material is returned into the one end of the composite material so as to create a looped end of the bladder at the one end of the composite material. The first end of the bladder is passed through the side opening and the second end of the bladder is passed into the one end of the fiber reinforcement and through the side opening. A hollow continuous annular shaped preform is formed by overlapping the ends of the fiber reinforcement. One of the ends of the bladder is sealed and the preform is placed into a mold. The preform is then molded into the desired shape by curing the preform within the mold while inflating the bladder.

Accordingly, it is an object of the present invention to provide an improved hollow fiber reinforced composite product having a substantially continuous surface and which does not exhibit discontinuities in the fiber reinforcement material.

It is a further object of the present invention to provide an apparatus and method for manufacturing a hollow fiber reinforced composite product having a substantially continuous surface and which avoids the need for discontinuities in the fiber reinforcement material.

Further objects of the present invention will become more apparent by reference to the following figures and detailed description.

DESCRIPTION OF THE PREFERRED EMBODIMENT

Figure 1:
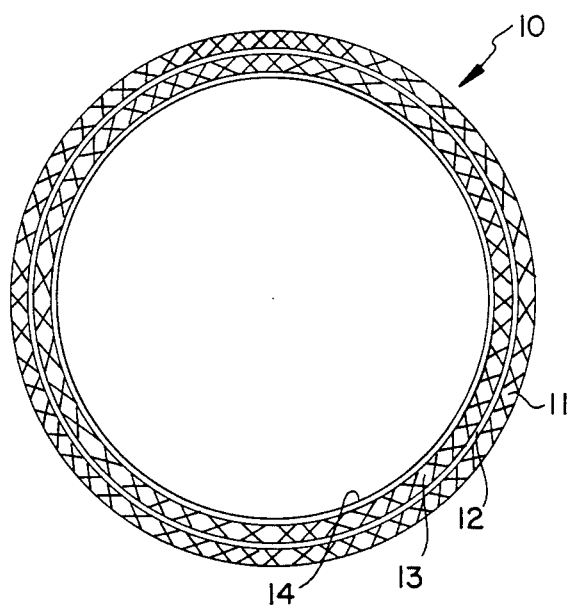
FIG. 1 is a cross sectional view of the laminate preform for the composite wheel rim of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The bicycle wheel rim of the present invention is preferably preformed using prepreg (preimpregnated) fiber reinforcement material. The terms "prepreg" and "preimpregnated" mean that the fiber reinforcement material used to make the preform has been impregnated with resin, thus avoiding the additional operation of resin wetting the dry fiber preform prior to performing the curing step. While the material cost of prepreg fiber reinforcement is usually higher than for dry fiber reinforcement, the elimination of the time and labor to wet out the fiber reinforcement can more than compensate for this added cost by affording higher production.

A cross sectional view of the preferred preform 10 for the bicycle rim of the present invention is shown in FIG. 1. The preform 10 is a tubular shaped laminate having three layers of prepreg fiber reinforcement 11, 12 and 13 over a tubular shaped plastic bladder 14. Layers 11 and 13 are comprised of tubular shaped lengths of braided reinforcement fibers or braids, while layer 12 is formed from unidirectional fiber reinforcement tape.

The braids 11 and 13 are a conventionally well known type of fiber reinforcement construction formed by a textile process in which the fibers are tied or interwoven to one another so as to fix the fiber orientation. Unlike filament winding, the fibers in a braid are mechanically locked which helps to better withstand shearing, twisting and impact forces. In the preferred embodiment, the braids 11 and 13 are prepreg 100% carbon fiber biaxial braid, 36 end, 30° braiding angle, 6k tow. A biaxial braid is preferred over triaxial braid reinforcement because of cost, but also because any desired 0° reinforcement can be provided by unidirectional tape which can be layered to provide more or less 0° reinforcement. The resin matrix impregnated within the braid is an epoxy having a 250° F. cure temperature. In the preferred embodiment described herein, the diameter of the tubular braids 11 and 13 are ⅝ inch. Obviously, the braid diameter may be varied to attain different bicycle rim widths. Prepreg braid meeting these specifications is commercially available from and manufactured by Newport Composites of Fountain Valley, California.

The purpose of the unidirectional tape 12 is to provide added stiffness and strength to the wheel rim in a direction which serves to maintain the circular shape. Although FIG. 1 shows the tape 12 having a two layers or windings, the tape 12 can be cut to different widths to provide more or less windings depending upon the strength requirements of the rim. The unidirectional tape 12 is preferably prepreg unidirectional carbon fiber tape having a 120 grams/yd.$^2$ areal weight. The resin matrix in the tape is epoxy having a 250° F. cure temperature. The width of the tape 12 is also varied depending upon the appropriate rim width desired for various bicycle tire widths. Unidirectional tape meeting these specifications is commercially available from and manufactured by Newport Composites of Fountain Valley, California.

The prepreg braids and unidirectional tape will eventually cure on their own if left exposed for prolonged periods at room temperature. Therefore to extend their shelf life, it is necessary to store such materials in sealed plastic bags in a freezer. Before usage, the prepreg braids and unidirectional tape are removed from the freezer and allowed to reach room temperature. This is readily observable because once room temperature is achieved there is no longer any condensation on the exterior of the plastic bags in which the prepreg materials are stored. The prepreg braids and unidirectional tape are then cut to approximately equal lengths which are slightly longer than the circumference of the finished rim.

The tubular bladder 14 may be of any plastic material suitable for air inflation and having a higher temperature resistance than the molding temperature, such as Nylon ® or Nojax ®. The tubular bladder 14 has an outer diameter at least as large as the desired diameter of the hollow or lumen inside the finished rim. In practice, an outer diameter of the bladder sized larger than the maximum outside diameter of the finished rim has been found to be preferred. The length of the bladder 14 is preferably cut at least 20" inches longer than the prepreg braids. This is necessary to allow a sufficient length of bladder to perform other steps hereafter described.

Figure 2:
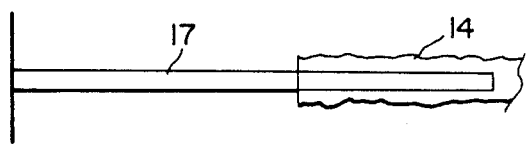
FIG. 2 is an elevation view showing the bladder being threaded over the mandrel in forming the laminate preform of FIG. 1.
Figure 3:
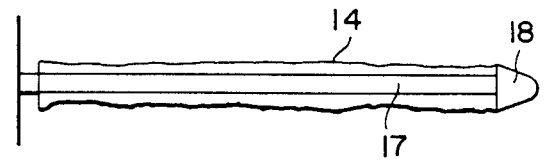
FIG. 3 is an elevation view showing a further step in forming the laminate preform of FIG. 1 in which the cap is mounted over the bladder and mandrel.

As seen in FIG. 2, perform is constructed by first advancing the tubular shaped bladder 14 over a tubular shaped mandrel 17 until the ends of the bladder and mandrel are aligned. In the illustrated embodiment, the mandrel is a metal tube having a diameter of approximately ½ inch. A tapered cap 18, shown in FIG. 3, is then placed over the ends of both mandrel 17 and bladder 14 to allow the braid 13 to be more easily advanced over bladder 14. Braid 13 (FIG. 1) is then placed or threaded over the bladder and centered so that even lengths of bladder extend from each end. The unidirectional tape 12 is then wrapped around the braid so that the fibers in the tape (which extend in the same direction as the length of the tape) extend parallel to the mandrel 17, bladder 14 and braid 13. The second braid 11 is then placed over the unidirectional tape 12 aligned with the ends thereof. To simplify production, braid 11 is cut from the same braid material as braid 13 and therefore has the same nominal diameter. However, the biaxial braid material will rather easily expand to allow braid 11 to fit over the unidirectional tape 12 and braid 13. This does cause the braid angle to change somewhat and shorten the length of the braid. The shortening of braid 11 is compensated for by cutting braid 11 to a slightly longer length than braid 13. The resultant laminate tube construction of bladder/braid/unidirectional tape/braid shown in FIG. 1 is thereafter removed from the mandrel 17 and wrapped around a former 18. As partially shown in FIG. 4, the former 18 has the shape of a circular disk in order to impart the desired diameter of curvature corresponding to the finished rim.

Next, a skewer tool (not shown) having a 0.38" inch diameter blunt point is poked through the side of the tubular composite laminates of the preform approximately one and a half inches from end of the braids 11 and 13 and tape 12. Preferably, this should be accomplished by advancing the skewer tool from inside the tubular composite laminate in a direction toward the center of curvature. Care should be taken when piercing the braids not to break any of the fiber filaments since this will unnecessarily weaken the strength of the finished rim. Rather, the skewer is advanced so as to spread apart adjacent yarns of filaments within the braid. Because the 0.38" diameter point of the skewer is relatively blunt, breakage of filaments is minimized. Once this side opening is made it may be secured from closing by soldering around the opening with a heat gun or similar device.

Figure 4:
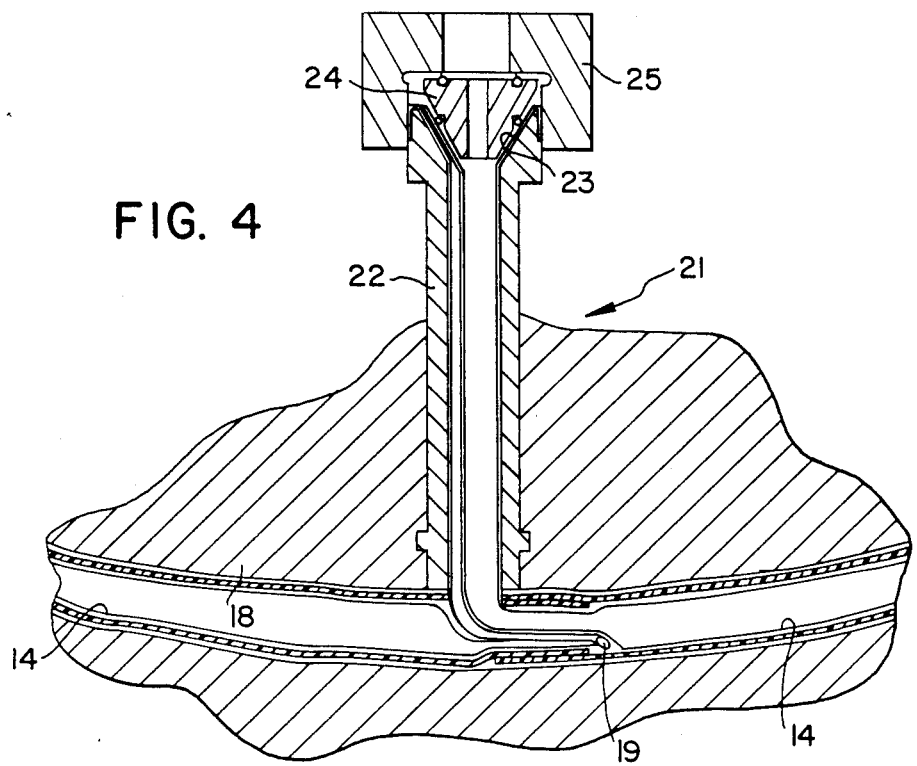
FIG. 4 is a fragmentary sectional view showing the preform of FIG. 1 mounted on the former with the air inlet nozzle attached to the preform.

Referring further to FIG. 4, the bladder end nearest the skewered opening is then returned or looped back inside the end of the braid/tape/braid laminate from which it extends, threaded through the skewered opening and drawn out approximately 6 inches so as to leave a doubling or loop 19 of the bladder 14 just exposed out the end of the braid/tape/braid laminate. The other end of the bladder 14 is then directed into the end of braid 13 containing the loop 19 and similarly threaded through the skewered side opening and drawn out approximately 6 inches.

By looping the bladder it is ensured that when the bladder is inflated there is no discontinuity in the hollow or lumen thereby created.

Once the end of bladder 14 nearest the loop 19 is drawn through the skewered opening, the end of the braid/tape/braid laminate closest to the skewered opening is tucked inside the other end of braid/tape/braid laminate, making sure that no length of bladder is pinched between the composite overlap. Preferably the overlap should be at least 1 inch. The result is a completed laminate composite preform in the form of a hollow ring with both ends of bladder 14 protruding through the skewered side opening.

Next, air inlet nozzle 21 is attached by slipping the two bladder ends through the stem 22 of the air inlet nozzle. Any excess amount of bladder material extending beyond the funnel shaped portion 23 of nozzle 21 is cut off and one of the bladder ends is opened so as to flair against the funnel shaped portion 23. Cone 24 is then seated in place and a threaded cap 25 screwed on firmly to stem 22. This will seal one end of the bladder while allowing air to enter the flaired end.

In practice it has been found preferable that air should pass through the end of the bladder not having the double back or loop, since the pressure needed to properly inflate bladder 14 during the molding/curing step will occasionally otherwise burst the bladder. Since it is difficult to determine which of the bladder ends extending from the skewered opening has the double back, the bladder end not having the loop should be marked before it is threaded through the skewered opening.

Figure 5:
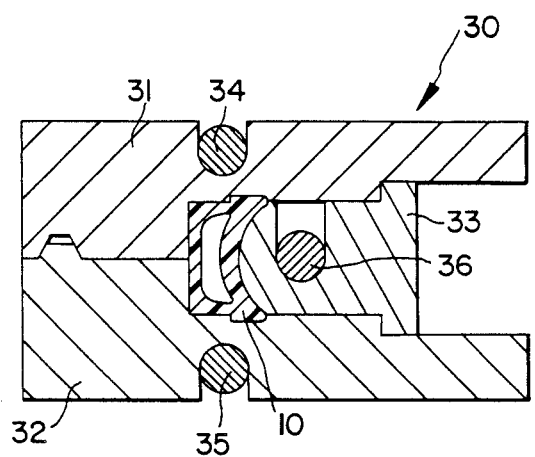
FIG. 5 is a perspective view diagrammatically depicting the press used to bring together the mold portions in performing the molding step on the laminate preform of FIG. 1.

After air inlet nozzle 21 is attached, the ring shaped preform is placed into the bottom portion 32 of female mold 30 with the air inlet nozzle located inward from the mold. FIG. 5 shows the components of female mold 30 in their closed position they would assume during the curing cycle of the molding step. The components of female mold 30 include top mold portion 31, bottom mold portion 32 and outer side mold segments 33.

Although only a cross section is depicted in FIG. 5, it should be understood that both the top and bottom mold portions 31 and 32 have a ring shape of identical cross section to that shown in FIG. 5 throughout. Further, although only the cross section of one outer mold segment is shown in FIG. 5, there are six identically formed segments 33 having an arcuate shape circumscribing an arc of 60° so that all six segments 33 circumscribe a full 360°. Each of the segments 33 have a cross sectional shape shown in FIG. 5 throughout their arcuate lengths.

Heating elements 34, 35 and 36 are mounted within recesses in top mold portion 31, bottom mold portion 32 and outer mold segments 33, respectively. The heating elements in top and bottom mold portions are ring shaped while heating elements 36 are arcuate shaped to correspond to the shape of segments 33.

Figure 6:
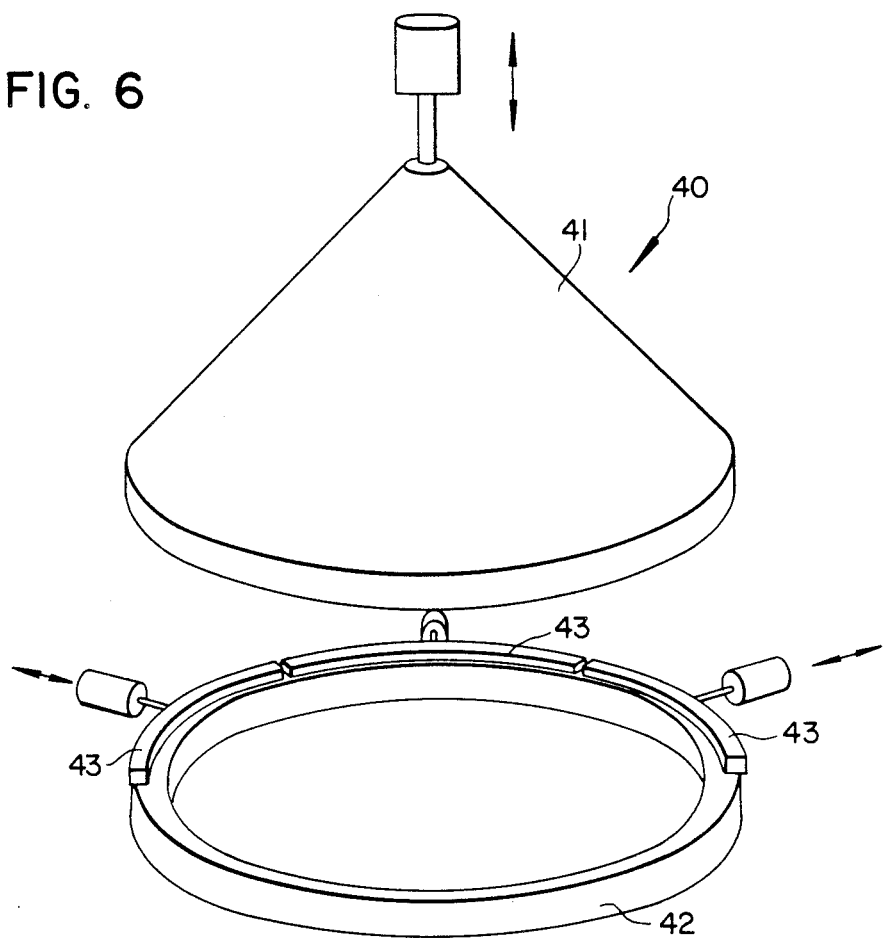
FIG. 6 is a sectional view showing the mold portions, locations of the heating elements and the rim during the curing period of the molding step.

FIG. 6 diagrammatically depicts the press 40 used to bring together and apart the mold portions 31 and 32 and mold segments 33. The press 40 includes a conically shaped top press member 41 in which is mounted the top mold portion 31. Top press member 41 reciprocates upwardly and downwardly in the direction of the arrows in closing and opening the female mold. A stationary ring 42 aligned directly below the top press member 41 receives the bottom mold portion 32 while the arcuate press segments 43 reciprocate in a direction towards and away from the center of ring 42 in a horizontal plane, thereby moving the corresponding outer mold segments 33 to their closed and open positions. Although only three press segments 43 are shown in FIG. 6, it should be understood that there are six such segments corresponding to the number of outer mold segments 33.

Referring to FIGS. 5 and 6, the molding cycle proceeds as follows: A pressurized air line (not shown) is attached not under pressure to the air inlet to nozzle 21. The mold is pre-heated by internal heating elements to a temperature of approximately 290° F. The mold temperature is held constant at this temperature throughout the molding cycle. After assuring that no pinching of the preform inside the mold will occur, the top mold portion 31 of the mold 30 is closed down onto the bottom mold portion 32 containing the preform. Preferably, the clamping forces are at least triple that of air pressure forces to assure total clamping and safety margin. A thirty seconds delay time passes before the six outer side mold segments 33 close, thus allowing time for the fiber composite materials to soften. Mold segments 33 close inwardly in a horizontal plane to complete the closing of the mold 30. Mold segments 33 exert the same clamping force load as is exerted between the top and bottom mold portions 31 and 32. After a further fifteen seconds delay time air pressure is introduced at approximately 95 p.s.i. This curing period in the cycle continues for approximately seventeen minutes. Once the curing period has elapsed, the air pressure is released and a twenty seconds safety delay time passes before the mold is opened.

Following the molding cycle, the cured composite rim is removed from the mold and allowed to cool on a flat table for approximately ten minutes. The composite rim is then trimmed of excess resin flash, sanded and finish coated.

The finished rim produced by this method avoids the need for openings at the end of fiber filaments. Further, while there is an overlap in ply lamination in the rim, there are no seams or joints along the rim which serve to undesirably weaken the structural strength of the overall product. Because the bladder does not exit the ends of the reinforcement, the ends of the laminate composite can be permitted to overlap, thereby allowing additional reinforcement to be present where there would otherwise be a discontinuity in the reinforcement. Yet further, since both ends of the bladder exit a common opening the number of such openings is reduced which further strengthens the finished product.

In addition, because the opening is created by separating adjacent yarns in the braids and the unidirectional tape, no breakage of fiber filaments occurs. Thus, there is complete continuity of the fibers around the opening leading to minimal reduction in structural strength.

The wheel rim of the present invention has a substantially continuous surface in that discontinuities are restricted to a single opening having relatively small size on the order of one half inch or less.

In the preferred embodiment herein described, the finished composite rim is used with disk wheels and composite spoked wheels. Alternatively, the mold shape and laminate design can readily be varied in order to manufacture a composite rim more suitable for traditional laced wheels having metal spokes.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. Thus, while the embodiment disclosed in the drawings and described in detail herein relates to the manufacture of a bicycle wheel rim, it is to be understood that the inventive method can also be suitably used to manufacture other fiber reinforced composite products having a substantially continuous surface and a hollow interior and where openings to the interior are undesired.

What is claimed is:

1. A hollow reinforced composite product comprising:
    a tubular body composed of a reinforced composite material having a pair of opposite ends, said opposite ends being in overlapping engagement to close said tubular body to form an annular configuration, and further having an opening therethrough proximate to one of said opposite ends;
    said tubular body manufactured by a process including the steps of
        (a) providing a tubular body including a reinforcement and providing a tubular shaped bladder;
        (b) inserting said bladder inside said tubular body so that the ends of said bladder extend outside the said opposite ends of said tubular body;
        (c) forming an opening in the side of said tubular body at a location spaced apart from said one of said opposite ends thereof;
        (d) passing a first end of said bladder through said side opening;
        (e) passing a second end of said bladder into said one of said opposite ends of said tubular body and through the side opening;
        (f) overlapping said opposite ends of said tubular body to form a hollow continuous preform having said annular configuration;
        (g) sealing one of the ends of said bladder;
        (h) placing the preform into a mold; and
        (i) molding the preform into a desired shape by curing the preform within said mold while inflating said bladder.

2. The product of claim 1 wherein prior to step (d) the process for manufacturing said product further comprises the step of returning said first end of said bladder into said one of said opposite ends of said tubular body so as to create a loop in said bladder at said one of said opposite ends of said tubular body.

3. The product of claim 1 wherein said desired shape of said product is in the shape of a wheel.

4. The product of claim 3 wherein said product is a bicycle rim.

5. The product of claim 1 wherein said sealing step (h) is accomplished by sealing the first end of said bladder.

6. The product of claim 1 wherein step (b) is accomplished on a mandrel.

7. The product of claim 6 wherein after the bladder is placed on the mandrel a cap is placed over the ends of both the mandrel and the bladder to facilitate placing the tubular body over the bladder.

8. The product of claim 1 wherein the composite material includes a length of prepreg braid.

9. The product of claim 8 wherein the composite material further includes a length of unidirectional tape and the process for manufacturing said product further includes the step of wrapping the unidirectional tape around the braid.

10. The product of claim 9 wherein the composite material includes two lengths of prepreg braid and the process for manufacturing said product further includes the step of placing the second length of prepreg braid over the unidirectional tape after the unidirectional tape is wrapped around the first length of prepreg braid.

11. The product of claim 10 wherein after the second length of prepreg braid is placed over the unidirectional tape the resultant laminate of bladder/braid/unidirectional tape/braid is formed around a former.

12. The product of claim 11 wherein step (c) is accomplished by advancing a blunt skewer through the internal face of the composite material and between the yarns of the braids at least about 1" from said one of the opposite ends of said tubular body.

13. The product of claim 1 wherein the bladder has an outer diameter at least as great as the outer diameter of the finished product.

14. The product of claim 1 wherein the overlap accomplished by step (g) is at least about 1 inch.

15. The product of claim 8, wherein the yarns of said prepreg braid are parted to define said opening through said tubular body.

16. A hollow reinforced composite molded product comprising:
    a tubular body of a reinforced composite material having an outer surface and a pair of opposite ends;
    an opening defined through the wall of said tubular body at a location proximate to one of said pair of ends;
    a region of overlap on said tubular body along which said pair of opposite ends overlap each other, said region of overlap being between said opening and said one of said pair of ends,
    wherein said outer surface is substantially continuous and said tubular body is closed to define an annular configuration and wherein said pair of open ends of said bladder extend through said opening in said tubular body; and
    an inflatable tubular bladder having a pair of open ends, said tubular bladder being disposed concentrically within said tubular body with said pair of open ends of said bladder proximate said opening in said tubular body.

* * * * *